US011586202B2

(12) United States Patent
Zhu et al.

(10) Patent No.: US 11,586,202 B2
(45) Date of Patent: Feb. 21, 2023

(54) AUTOMATIC DRIVING SAFETY INTERACTION SYSTEM

(71) Applicants: Baidu USA LLC, Sunnyvale, CA (US); Baidu.com Times Technology (Beijing) Co., Ltd., Beijing (CN)

(72) Inventors: Fan Zhu, Sunnyvale, CA (US); Lin Ma, Beijing (CN); Xin Xu, Beijing (CN)

(73) Assignees: BAIDU USA LLC, Sunnyvale, CA (US); BAIDU.COM TIMES TECHNOLOGY (BEIJING) CO. LTD., Beijing (CN)

( * ) Notice: Subject to any disclaimer, the term of this patent is extended or adjusted under 35 U.S.C. 154(b) by 785 days.

(21) Appl. No.: 16/338,398

(22) PCT Filed: Mar. 28, 2019

(86) PCT No.: PCT/CN2019/080069
§ 371 (c)(1),
(2) Date: Mar. 29, 2019

(65) Prior Publication Data
US 2021/0191393 A1    Jun. 24, 2021

(51) Int. Cl.
*G05D 1/00* (2006.01)
*G07C 5/02* (2006.01)
*B60W 60/00* (2020.01)
*B60W 50/00* (2006.01)

(52) U.S. Cl.
CPC .............. *G05D 1/0061* (2013.01); *G07C 5/02* (2013.01); *B60W 60/0053* (2020.02); *B60W 2050/007* (2013.01); *B60W 2050/0095* (2013.01)

(58) Field of Classification Search
CPC .............. G05D 1/0061; G05D 1/0088; B60W 2050/0095; B60W 2050/0072; B60W 60/0053–0054; B60W 50/082; B60W 2050/007; B60W 60/0059; B60W 50/0205; B60W 50/029; B60W 2050/021–022; B60W 50/02; B60W 50/0297; B60W 50/14
See application file for complete search history.

(56) References Cited

U.S. PATENT DOCUMENTS

| 10,672,389 B1* | 6/2020 | Abeloe | .................. G10L 13/00 |
| 2018/0194364 A1* | 7/2018 | Asakura | ............ B60W 50/0205 |
| 2019/0184998 A1* | 6/2019 | Zheng | ................. B60W 60/007 |
| 2019/0369635 A1* | 12/2019 | Kobayashi | ........ B60W 60/0059 |
| 2020/0079394 A1* | 3/2020 | Masuda | .................. B60R 21/00 |
| 2020/0164895 A1* | 5/2020 | Boss | ................... B60W 50/082 |
| 2020/0192357 A1* | 6/2020 | Park | ................ B60W 60/00186 |

* cited by examiner

*Primary Examiner* — Donald J Wallace
(74) *Attorney, Agent, or Firm* — Womble Bond Dickinson (US) LLP

(57) ABSTRACT

The disclosure describes various embodiments for monitoring safety of an autonomous driving vehicle (ADV). In one embodiment, a method includes the operations of receiving, by a vehicle controller, one or more error message from a patrol module, the one or more error messages generated by an autonomous driving system of the ADV operating in an autonomous mode, the patrol module monitoring the autonomous driving system; evaluating a status of the autonomous driving system based on the one or more error messages; and keeping the ADV in the autonomous mode or switching it to a manual mode based on the status of the autonomous driving system.

17 Claims, 4 Drawing Sheets

AUTOMATIC DRIVING SAFETY INTERACTION SYSTEM

CROSS-REFERENCE TO RELATED APPLICATION

This patent application is a U.S. National Phase Application under 35 U.S.C. § 371 of International Application No. PCT/CN2019/080069, filed Mar. 28, 2019, entitled "AN AUTOMATIC DRIVING SAFETY INTERACTION SYSTEM," which is incorporated by reference herein by its entirety.

TECHNICAL FIELD

Embodiments of the present disclosure relate generally to operating autonomous driving vehicles. More particularly, embodiments of the disclosure relate to an automatic driving safety interaction system for use in operating autonomous driving vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers. Like any other types of driving, safety is an indispensable part of autonomous driving. A vehicle operating in an autonomous mode can encounter a variety of issues that may make it unsafe to keep the vehicle in the autonomous mode.

For example, some or all light detection and ranging (LiDAR) sensors may malfunction. In such a situation, a vehicle operating in an autonomous mode would not be able to accurately perceive and detect obstacles in the surrounding environment, which makes it dangerous to keep driving the vehicle in the autonomous mode.

SUMMARY

In a first aspect, the present disclosure provides a computer-implemented method for monitoring safety of an autonomous driving vehicle (ADV), the method comprising: receiving, by a vehicle controller, one or more error messages from a patrol module, wherein the one or more error messages are generated by an autonomous driving system of the ADV operating in an autonomous mode and received by the patrol module that monitors the autonomous driving system; evaluating a status of the autonomous driving system based on the one or more error messages; and maintaining the ADV in the autonomous mode or switching it to a manual mode based on the status of the autonomous driving system.

In a second aspect, the present disclosure provides a non-transitory machine-readable medium having instructions stored therein for monitoring safety of an autonomous driving vehicle (ADV), the instructions, when executed by a processor, causing the processor to perform operations, the operations comprising: receiving, by a vehicle controller, one or more error messages from a patrol module, wherein the one or more error messages are generated by an autonomous driving system of the ADV operating in an autonomous mode and received by the patrol module that monitors the autonomous driving system; evaluating a status of the autonomous driving system based on the one or more error messages; and maintaining the ADV in the autonomous mode or switching it to a manual mode based on the status of the autonomous driving system.

In a third aspect, the present disclosure provides a data processing system, comprising: a processor; and a memory coupled to the processor to store instructions, which when executed by the processor, cause the processor to perform operations, the operations including: receiving, by a vehicle controller, one or more error messages from a patrol module, wherein the one or more error messages are generated by an autonomous driving system of the ADV operating in an autonomous mode and received by the patrol module that monitors the autonomous driving system; evaluating a status of the autonomous driving system based on the one or more error messages; and maintaining the ADV in the autonomous mode or switching it to a manual mode based on the status of the autonomous driving system.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

The disclosure describes various embodiments for monitoring safety of an autonomous driving vehicle (ADV). In one embodiment, a method includes the operations of receiving, by a vehicle controller, one or more error message from a patrol module, the one or more error messages generated by an autonomous driving system of the ADV operating in an autonomous mode, the patrol module monitoring the autonomous driving system; evaluating a status of the autonomous driving system based on the one or more error messages; and keeping the ADV in the autonomous mode or switching it to a manual mode based on the status of the autonomous driving system.

In one embodiment, the vehicle controller subscribes to the patrol module for error messages, wherein each error message is associated with an error level. The patrol module broadcasts error messages with a number of user-defined levels, including WARNING, FATAL, and SERIOUS. The vehicle controller, in response to receiving a particular level of error message, can generate a message corresponding to the level of error message to represent the status of the autonomous driving system. The vehicle controller can send the status of the autonomous driving system to a driving mode controller, which is to keep the autonomous mode or switch it to a manual mode based on the level of the status information of the autonomous driving system.

In one embodiment, the driving mode module can switch the ADV to a manual mode if the status information indicates the ADV is in a fatal condition, and keep the autonomous mode if the status information indicates the ADV is in a warning condition.

Figure 1:
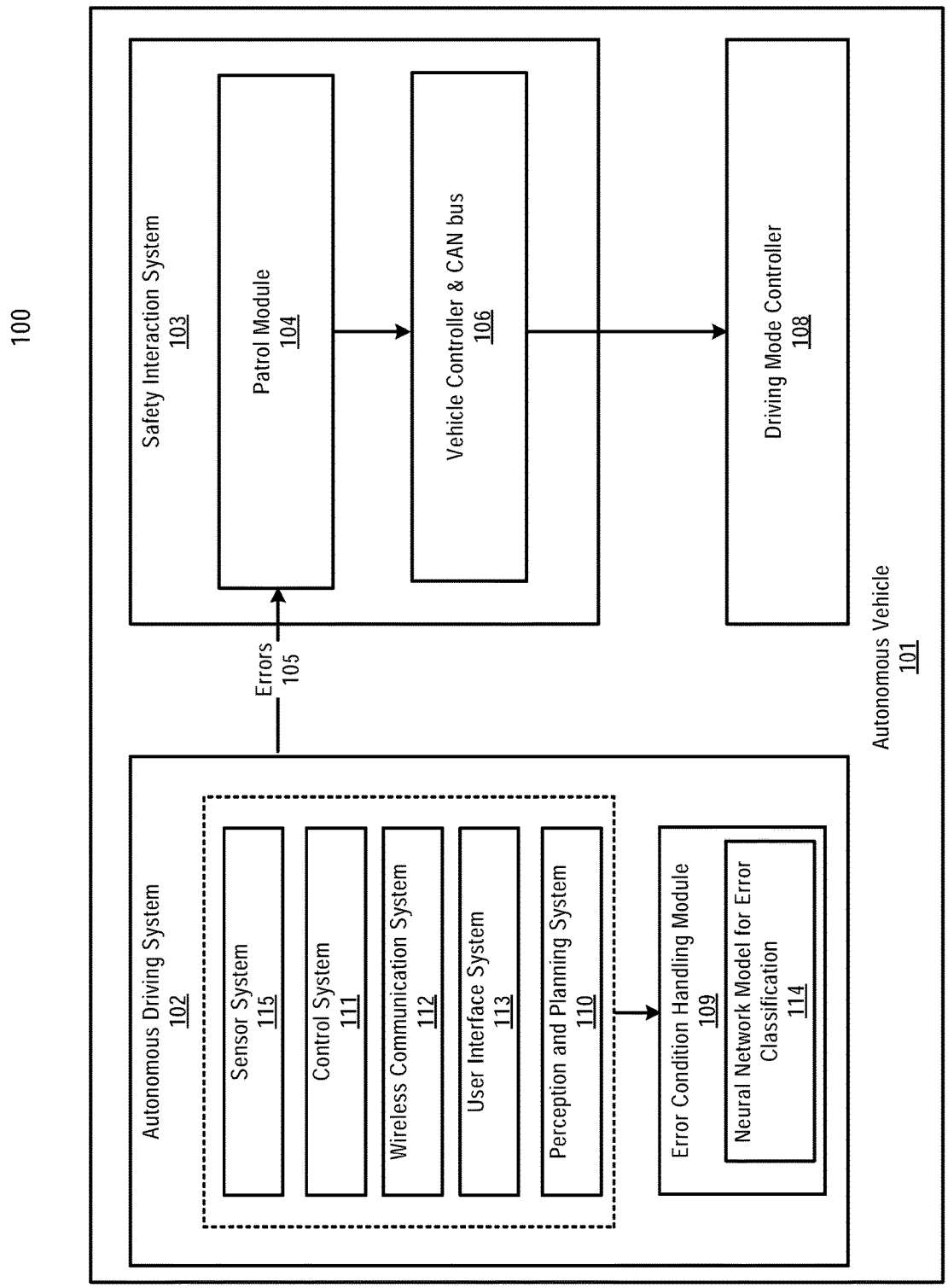
FIG. 1 is a block diagram illustrating a networked system according to one embodiment.

FIG. 1 is a block diagram illustrating an autonomous vehicle network configuration according to one embodiment of the disclosure. Referring to FIG. 1, network configuration 100 includes autonomous vehicle 101, which refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 can include an autonomous driving system 102 for operating and controlling autonomous vehicle 101 when autonomous vehicle 101 is operating in an autonomous mode. The autonomous driving system 102 can include perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

In one embodiment, autonomous vehicle 101 can further include a safety interaction system 103 for safety interaction. The safety interaction system 103 can monitor system operations and generate status messages of the autonomous driving system 102 when the autonomous driving system 102 does not work as expected.

As shown, the safety interaction system 103 can include a patrol module 104 and a vehicle controller and CAN bus module 106. A CAN bus is a vehicle bus standard designed to allow microcontrollers and devices to communicate with each other in applications without a host computer. It is a message-based protocol, designed originally for multiplex electrical wiring within automobiles, but is also used in many other contexts. Components 110-115 may be communicatively coupled to each other via the vehicle controller and CAN bus module 106.

In one embodiment, the autonomous driving system 102 can encounter a variety of errors which prevent the ADV operating in an autonomous driving mode from driving safely.

For example, when one or more sensors (e.g., a GPS sensor or a LIDAR sensor) does not work as expected, the perception and planning system 110 may experience problems in navigating the ADV in the world coordination. As another example, when GPS signals are weak or are blocked by buildings, the GPS sensor may generate GPS data with position standard deviations larger than a predetermined threshold, and accordingly, the perception and planning system 110 may not be able to navigate the ADV accurately using the GPS data and map data in the world coordination. Similarly, the perception and planning system 110 may not receive any sensor data from a LIDAR or experience a longer delay in receiving sensor data, which can also prevent the perception and planning system 110 from navigating the ADV accurately in the world coordination.

In one embodiment, the patrol module 104 can receive error messages 105 from the autonomous driving system 102. Each error message has information indicating the level of error. The level of an error describes the extent of impact that error may have on the safety of the ADV if the ADV continues to operate in the autonomous mode. For example, the levels of errors can include "WARNING", "FATAL", and "SERIOUS".

In one embodiment, each level of error can be predefined using a predetermined algorithm which provides static mappings between each level of error to error conditions. For example, a FATAL message can be generated when all LIDAR sensors stop functioning; a WARNING error message can be generated when one or more GPS sensors generate GPS data with position standard deviations larger than a predetermined threshold; and a SERIOUS message can be generated when at least one LIDAR sensors function as expected and at least one other GPS sensor malfunctions.

In an alternative embodiment, the level of an error can be dynamically determined based on a driving environment of the ADV. In this implementation, the same set of error conditions may be associated with a different error level depending on the driving conditions of the ADV.

For example, when the ADV is driving in an autonomous mode in clear weather in the daytime, a SERIOUS message would be generated if all cameras malfunction and all LIDAR sensors function as expected. In a raining night, however, the autonomous driving system 102 may generate a WARNING message in response to the same set of conditions since cameras are not that important in a raining night.

In one embodiment, a trained neural network 114 in an error condition handling modules 109 in autonomous vehicle 101 can be used to generate different levels of error messages from error conditions in the autonomous driving system. The neural network can be trained using datasets covering various combinations of driving environments and error conditions, and corresponding safety issues or lack thereof. Examples of the driving conditions can include a variety of road types, obstacle types, road environments, and weathers. Examples of the corresponding safety issues may include whether the ADV follows a reference line and whether the ADV stops at a red traffic light.

In one embodiment, in response to receiving one or more errors 105 with information indicating the level of the errors and information describing the conditions that prompt the generating of the errors, the patrol module 104 can put the errors and associating information on a message queue that is subscribed to by the vehicle controller and CAN bus module 106. The vehicle controller and CAN bus module 106 can dequeue the error messages and their associated information from the message queue, and evaluate the current status of the autonomous driving system 102 based on the one or more errors and the associated information, and send the result of the evaluation and a driving mode information to a driving mode controller 108. The driving mode controller 108 can execute one or more commands from the vehicle controller and CAN bus module 106 to keep the ADV in an autonomous driving mode or switch the ADV to a manual mode.

Figure 2:
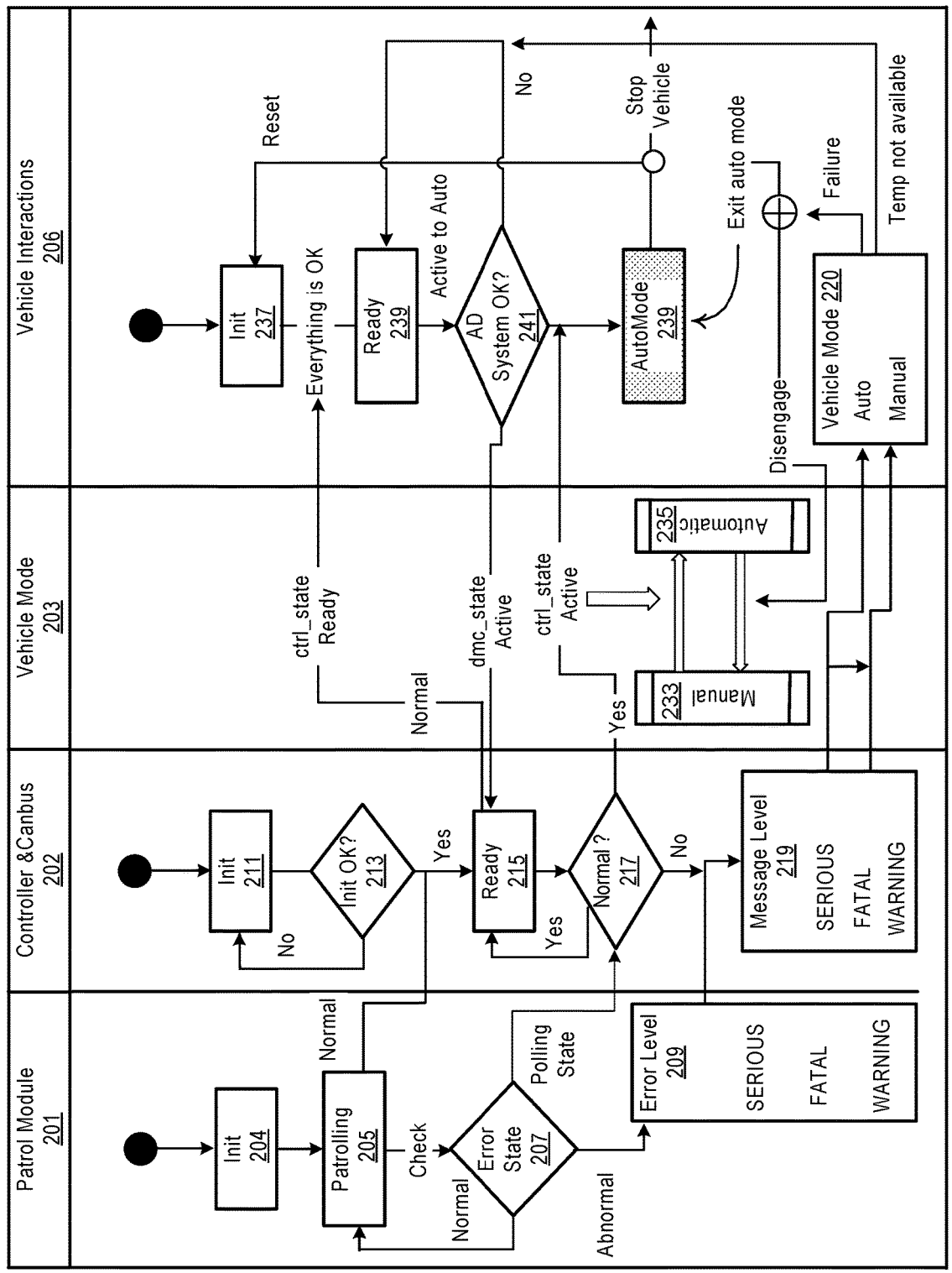
FIG. 2 is a block diagram illustrating an example of a data flow for monitoring safety of an autonomous vehicle according to one embodiment.

FIG. 2 is a block diagram illustrating an example of data flow for monitoring safety of an autonomous vehicle according to one embodiment. As shown in FIG. 2, a patrol module 201 operates to monitor states of an autonomous driving system in a vehicle. The autonomous driving system can include various sub-systems and modules configured for operating the vehicle in an autonomous mode. In the patrol module 201, an initialization operation 204 is performed to start the patrol module 201. Once the patrol module 201 is successfully initialized, it can perform a patrolling operation 205 to check error states 207 of the autonomous driving system.

The error states 207 can include various error conditions related to the modules and sub-systems in the autonomous driving system. Examples of the error conditions include one or more sensor failures, for example, LiDAR sensor failures, GPS signal loss, camera malfunctions, or any other conditions (e.g., flat tire) which may make it unsafe to operate the vehicle in an autonomous mode.

If the autonomous driving system functions as expected, the error states 207 is considered normal, and would not contain error conditions that would negatively impact the safety of the vehicle if the vehicle is to operate in an autonomous mode. In such a scenario, the patrol module 201 would continue patrolling/monitoring the autonomous driving system. However, if the error states 207 include error conditions that may negatively impact the safety of the vehicle, the error states 207 would be considered abnormal, and can be classified into different levels 209 (e.g., SERIOUS, FATAL, and WARNING).

As further shown in FIG. 2, a controller and CAN bus module 202 can perform an initialization operation 211 and another operation 213 to check if the initialization operation is successful. If the initialization operation 211 is confirmed to be successful, the controller and CAN bus module 202 is put in a ready state 215, in which the vehicle is ready for autonomous driving and waiting to receive states from various systems of the vehicle, including receiving error states from the patrol module 201 in response to polling the error states.

The controller and CAN bus module 202 itself can function as expected. In such a scenario, the controller and CAN bus module 202 can be considered to be in a normal 217 state. In such a scenario, one or more commands (e.g., ctrl state active) can be sent to safety interaction components 206 of the vehicle. As shown in FIG. 2, these safety interaction components 206 can be initialized 237 and be put in a ready state 239 after a successful initialization. The successfully initialized components including safety interaction components 206 and the controller and CAN bus module 202 can be in constant communication. For example, the controller and CAN bus module 202 can send commands to the components and receive state updates from these components 206.

If the patrol module 201 does not detect any error states that may negatively impact the safety of the vehicle if operating in an autonomous mode and the controller and CAN bus module 202 functions as expected, the autonomous driving system would be considered OK 241, in which case the vehicle is put in an autonomous mode 239.

While the vehicle is driving in an autonomous mode, the patrol module 201 can continue monitoring the autonomous driving system. If the patrol module 201 detects error states that may negatively impact the safety of the vehicle, these error states coupled with one or more error states from the controller and CAN bus module 202 can be combined to generate messages 219 with different levels. The generated messages can be used to determine whether to keep the vehicle in the autonomous mode 235 or switch the vehicle to a manual mode 233. The driving mode switching can be performed by a vehicle mode module 203.

For example, if the message is at the level of SERIOUS, the vehicle mode module 203 may keep the vehicle in the autonomous mode. If the message is at the level of FATAL, however, the vehicle mode module 203 can switch the vehicle mode 220 from auto to manual. In this scenario, the vehicle would exit the autonomous mode, and stop for the driver to take over, who can manually drive the vehicle.

If all applications and modules have been successfully initialized and no failures are detected in the autonomous driving system or the controller and CAN bus module 202, but some prerequisites for autonomous driving are missing (e.g., no destination defined by a user), the vehicle would wait until the prerequisites are met. Other details in the data flow diagram would be apparent to those skilled in the art and are not described herein in detail.

Figure 3:
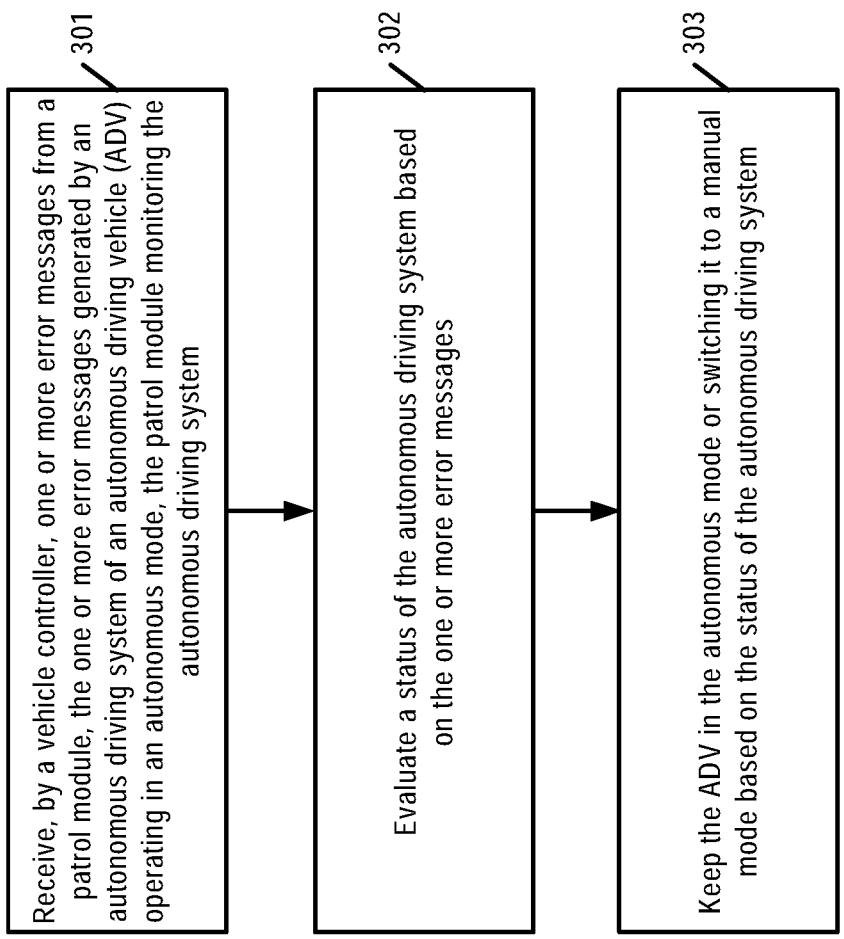
FIG. 3 is a block diagram illustrating an example of a method of monitoring safety of an autonomous vehicle according to one embodiment.

FIG. 3 is a block diagram illustrating an example of a method of monitoring safety of an autonomous vehicle according to one embodiment. Process 300 may be performed by a processing logic which may include software, hardware, or a combination thereof. Process 300 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, process 300 may be performed by one or more of the patrol module 104, and the vehicle controller and CAN bus module 106 as illustrated in FIG. 1.

Referring to FIG. 3, in operation 301, the processing logic in an autonomous driving vehicle receives one or more error message from a patrol module, the one or more error messages generated by an autonomous driving system of an ADV operating in an autonomous mode, the patrol module monitoring the autonomous driving system. The error messages may indicate a variety of error conditions that may prevent the ADV operating in an autonomous driving mode from driving safely. Examples of the error messages include various physical sensor failures, or malfunctions resulted from the block of externa environments (e.g., GPS signal loss due to the blockage of tall buildings in a downtown). The error messages can be classified into different levels based on their impact on the safety of the ADV. The classification can be determined based on a predetermined algorithm or a trained neural network.

In operation 302, the processing logic evaluates a status of the autonomous driving system based on the one or more error messages. The evaluation is based on the associated level of an error message alone, or in combination with additional error conditions from the controller and CAN bus module.

In operation 303, in response to receiving the status information of the autonomous driving system of the ADV, the processing logic determines whether to keep the ADV in an autonomous mode or switch it to a manual mode.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 4:
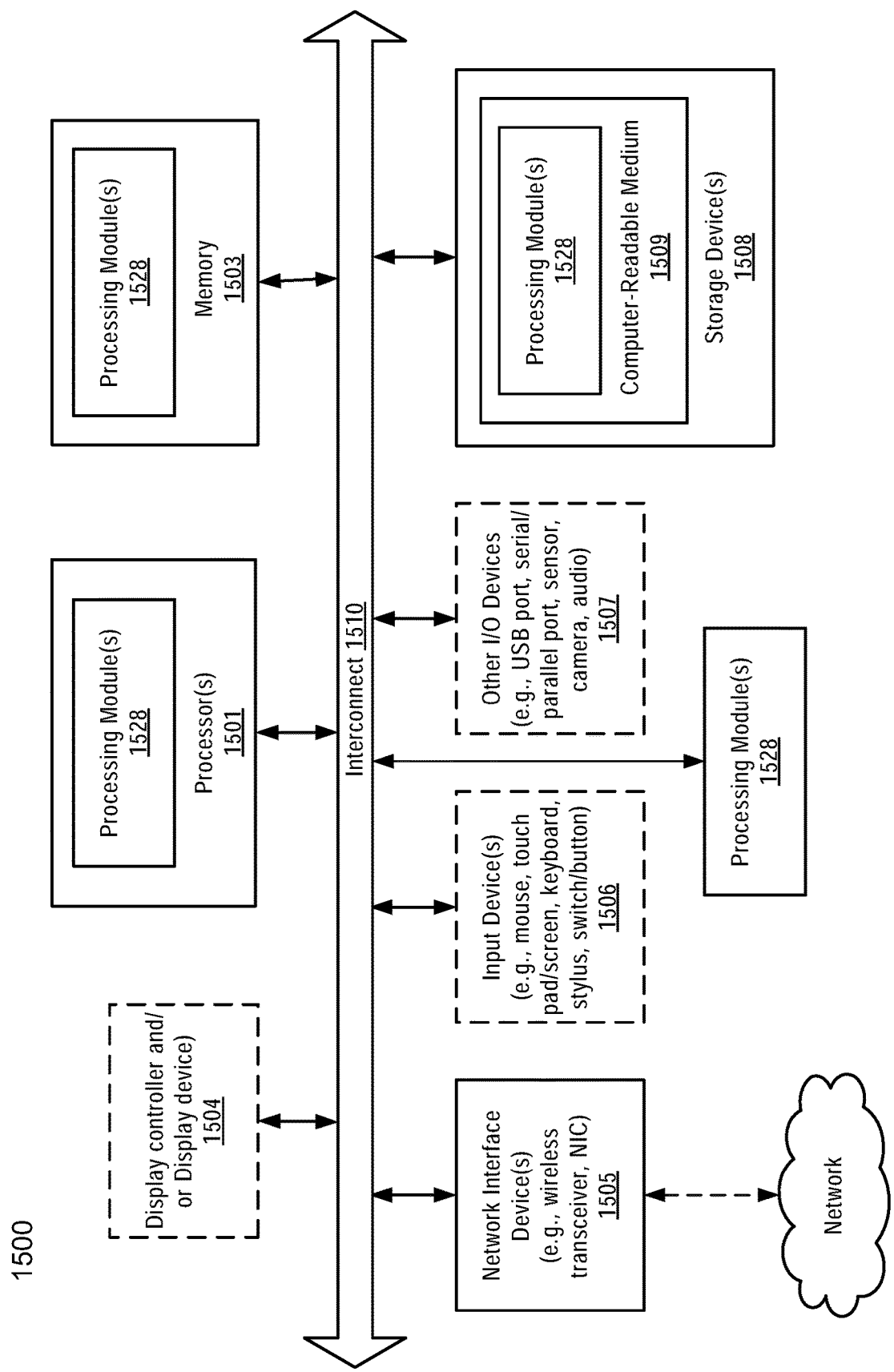
FIG. 4 is a block diagram illustrating a data processing system according to one embodiment.

FIG. 4 is a block diagram illustrating an example of a data processing system which may be used with one embodiment of the disclosure. For example, system 1500 may represent any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, the vehicle controller and CAN bus module 106, the patrol module 104. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for monitoring safety of an autonomous driving vehicle (ADV), the method comprising:
    receiving, by a vehicle controller, one or more error messages from a patrol module, wherein the one or more error messages are generated by an autonomous driving system of the ADV operating in an autonomous mode and received by the patrol module that monitors the autonomous driving system, wherein the one or more error messages are based, at least in part, on operational statuses of:
        one or more light detection and ranging (LIDAR) sensors of the ADV, and
        one or more global positioning sensor (GPS) of the ADV, and
    wherein the patrol module broadcasts error messages with a plurality of levels including WARNING, FATAL, and SERIOUS, wherein:
        the error messages include the FATAL level when all of the one or more LIDAR sensors stop functioning,
        the error messages include the SERIOUS level when at least one of the one or more LIDAR sensors of the ADV is operable, and at least one of the one or more GPSs malfunctions, and
        the error messages include the WARNING level when a GPS of the one or more GPSs generates GPS data with position standard deviations larger than a predetermined threshold;
    evaluating a status of the autonomous driving system based on the one or more error messages; and
    maintaining the ADV in the autonomous mode or switching it to a manual mode based on the status of the autonomous driving system.

2. The method of claim 1, wherein the vehicle controller subscribes to the patrol module for receiving error messages, wherein each error message is associated with an error level.

3. The method of claim 1, wherein the vehicle controller, in response to receiving a particular level of error message, is to generate a message corresponding to the level of error message to represent the status of the autonomous driving system.

4. The method of claim 1, wherein the vehicle controller is to send the status of the autonomous driving system to a driving mode controller, which is to keep the autonomous mode or switch the ADV to a manual mode based on the level of the one or more error messages, wherein the status of the autonomous driving system is in a fatal condition when the one or more messages indicate the FATAL level and the status of the autonomous driving system is in a warning condition when the one or more messages indicate the WARNING level.

5. The method of claim 4, wherein the driving mode controller module is to switch the ADV to a manual mode if the status indicates the ADV is in a fatal condition.

6. The method of claim 4, wherein the driving mode controller is to keep the autonomous mode if the status indicates the ADV is in a warning condition.

7. A non-transitory machine-readable medium having instructions stored therein for monitoring safety of an autonomous driving vehicle (ADV), the instructions, when executed by a processor, causing the processor to perform operations, the operations comprising:
    receiving, by a vehicle controller, one or more error messages from a patrol module, wherein the one or more error messages are generated by an autonomous driving system of the ADV operating in an autonomous mode and received by the patrol module that monitors the autonomous driving system, wherein the one or more error messages are based, at least in part, on operational statuses of:
        one or more light detection and ranging (LIDAR) sensors of the ADV, and
        one or more global positioning sensor (GPS) of the ADV, and
    wherein the patrol module broadcasts error messages with a plurality of levels including WARNING, FATAL, and SERIOUS, wherein:
        the error messages include the FATAL level when all of the one or more LIDAR sensors stop functioning,
        the error messages include the SERIOUS level when at least one of the one or more LIDAR sensors of the ADV is operable, and at least one of the one or more GPSs malfunctions, and
        the error messages include the WARNING level when a GPS of the one or more GPSs generates GPS data with position standard deviations larger than a predetermined threshold;
    evaluating a status of the autonomous driving system based on the one or more error messages; and
    maintaining the ADV in the autonomous mode or switching it to a manual mode based on the status of the autonomous driving system.

8. The non-transitory machine-readable medium of claim 7, wherein the vehicle controller subscribes to the patrol module for receiving error messages, wherein each error message is associated with an error level.

9. The non-transitory machine-readable medium of claim 7, wherein the vehicle controller, in response to receiving a particular level of error message, is to generate a message corresponding to the level of error message to represent the status of the autonomous driving system.

10. The non-transitory machine-readable medium of claim 7,
    wherein the vehicle controller is to send the status of the autonomous driving system to a driving mode controller, which is to keep the autonomous mode or switch the ADV to a manual mode based on the level of the one or more error messages, wherein the status of the autonomous driving system is in a fatal condition when the one or more messages indicate the FATAL level and the status of the autonomous driving system is in a warning condition when the one or more messages indicate the WARNING level.

11. The non-transitory machine-readable medium of claim 10, wherein the driving mode controller is to switch the ADV to a manual mode if the status indicates the ADV is in a fatal condition.

12. The non-transitory machine-readable medium of claim 10, wherein the driving mode controller is to keep the autonomous mode if the status indicates the ADV is in a warning condition.

13. A data processing system, comprising:
a processor; and
a memory coupled to the processor to store instructions, which when executed by the processor, cause the processor to perform operations, the operations including
receiving, by a vehicle controller, one or more error messages from a patrol module, wherein the one or more error messages are generated by an autonomous driving system of an autonomous driving vehicle (ADV) operating in an autonomous mode and received by the patrol module that monitors the autonomous driving system, wherein the one or more error messages are based, at least in part, on operational statuses of:
one or more light detection and ranging (LIDAR) sensors of the ADV, and
one or more global positioning sensor (GPS) of the ADV, and
wherein the patrol module broadcasts error messages with a plurality of levels including WARNING, FATAL, and SERIOUS, wherein:
the error messages include the FATAL level when all of the one or more LIDAR sensors stop functioning,
the error messages include the SERIOUS level when at least one of the one or more LIDAR sensors of the ADV is operable, and at least one of the one or more GPSs malfunctions, and
the error messages include the WARNING level when a GPS of the one or more GPSs generates GPS data with position standard deviations larger than a predetermined threshold;
evaluating a status of the autonomous driving system based on the one or more error messages; and
maintaining the ADV in the autonomous mode or switching it to a manual mode based on the status of the autonomous driving system.

14. The system of claim 13, wherein the vehicle controller subscribes to the patrol module for receiving error messages, wherein each error message is associated with an error level.

15. The system of claim 13, wherein the vehicle controller, in response to receiving a particular level of error message, is to generate a message corresponding to the level of error message to represent the status of the autonomous driving system.

16. The system of claim 13, wherein the vehicle controller is to send the status of the autonomous driving system to a driving mode controller, which is to keep the autonomous mode or switch the ADV to a manual mode based on the level of the one or more error messages, wherein the status of the autonomous driving system is in a fatal condition when the one or more messages indicate the FATAL level and the status of the autonomous driving system is in a warning condition when the one or more messages indicate the WARNING level.

17. The system of claim 16, wherein the driving mode controller is to switch the ADV to a manual mode if the status indicates the ADV is in a fatal condition.

* * * * *